United States Patent
Burggraf et al.

(10) Patent No.: US 8,348,440 B2
(45) Date of Patent: Jan. 8, 2013

(54) VISION SYSTEM

(75) Inventors: Hubert Burggraf, Oyten (DE); Wilfried Plass, Bremen (DE); Michael Paschold, Neunkirchen (DE); Hans Born, Bremen (DE)

(73) Assignee: Rheinmetall Defence Electronics GmbH, Bremen (DE)

( * ) Notice: Subject to any disclaimer, the term of this patent is extended or adjusted under 35 U.S.C. 154(b) by 958 days.

(21) Appl. No.: 11/666,322

(22) PCT Filed: Sep. 21, 2005

(86) PCT No.: PCT/EP2005/010173
§ 371 (c)(1),
(2), (4) Date: Jun. 9, 2009

(87) PCT Pub. No.: WO2006/045381
PCT Pub. Date: May 4, 2006

(65) Prior Publication Data
US 2009/0253104 A1    Oct. 8, 2009

(30) Foreign Application Priority Data

Oct. 26, 2004 (DE) .......................... 10 2004 052 102

(51) Int. Cl.
G03B 21/00 (2006.01)
G03B 21/14 (2006.01)
G03B 21/26 (2006.01)
G09B 9/08 (2006.01)
(52) U.S. Cl. ............... 353/122; 353/20; 353/29; 434/38; 434/41
(58) Field of Classification Search .......... 353/20, 353/29, 122; 434/20–21, 36–38, 41–44
See application file for complete search history.

(56) References Cited

U.S. PATENT DOCUMENTS
4,161,070 A * 7/1979 Pardes et al. .................. 434/1
(Continued)

FOREIGN PATENT DOCUMENTS
| EP | 0443 793 A | 8/1991 |
| EP | 1 241 652 A | 9/2002 |
| FR | 27 11 808 A | 5/1995 |
| WO | WO-98/24240 A | 6/1998 |

OTHER PUBLICATIONS

Written Office Action from the International Search Office (PCT/ISA/237) with translation, Oct. 13, 2006.

(Continued)

*Primary Examiner* — Tony Ko
*Assistant Examiner* — Jori S Reilly-Diakun
(74) *Attorney, Agent, or Firm* — Venable LLP; Jeffri A. Kaminski; Robert Kinberg

(57) ABSTRACT

The invention relates to a vision system for representing synthetically generated images for the stimulation of night vision appliances, especially in training simulators for driving or flight training, and lighting and observation operations in night vision conditions. Said system comprises an image generator (17) for generating image signals of a synthetic image, at least one projector (16) which is fed with the image signals and used to project the image onto at least one projection screen (11), and a night vision appliance (15) for visualizing the projected image. The aim of the invention is to create a technically less complex, cost-effective visual system, whereby the projected image is visualized through the night vision appliance (15) in an undisturbed manner when the night vision appliance is stimulated correctly. To this end, the at least one projector (16) comprises a laser source producing a laser projection beam, that radiates an optical wavelength (X) in the non-visible spectral region and within the spectral sensitivity of the night vision appliance (15). The image signals are modulated onto the laser source, which is preferably a laser diode. Preferably, a narrow-band interference filter (19) adapted to the optical wavelength (X) of the laser source is mounted upstream of the night vision appliance (15).

9 Claims, 2 Drawing Sheets

U.S. PATENT DOCUMENTS

| | | | | |
|---|---|---|---|---|
| 5,260,729 | A | * | 11/1993 | Ullah et al. ................. 353/84 |
| 5,267,061 | A | * | 11/1993 | Ansley et al. ................. 359/15 |
| 5,380,204 | A | | 1/1995 | Decker |
| 6,154,259 | A | * | 11/2000 | Hargis et al. ................. 348/756 |
| 6,196,845 | B1 | * | 3/2001 | Streid ................. 434/44 |
| 6,758,586 | B1 | * | 7/2004 | Wilhem et al. ................. 362/471 |
| 6,780,015 | B2 | * | 8/2004 | Swaine et al. ................. 434/44 |
| 7,200,536 | B2 | * | 4/2007 | Wynn ................. 703/7 |
| 7,663,795 | B2 | * | 2/2010 | Blackham ................. 359/237 |

OTHER PUBLICATIONS

Response to Office Action dated Aug. 28, 2006 with translation.
"STN Atlas Laser-Sichtsystem fur Tornado-Flugsimulatoren" OnLine! Jul. 11, 2003, XP002363493 Gefunden im Internet: URL:http//www.rheinmetall-detec.de/index.php?ang+2&fid+591> 'gefunden am Jan. 18, 2006! das ganze Dokument.

* cited by examiner

VISION SYSTEM

TECHNICAL FIELD

The invention relates to a vision system of the type as defined in the preamble to claim 1 for displaying synthetically generated images for the stimulation of night vision devices and is used, in particular, in training simulators for driving and flight control training, as well as for the training of reconnaissance and observation operations under night vision conditions. Night vision devices are understood to include thermal imaging cameras, which in most cases are vehicle-mounted, as well as night vision goggles and field glasses provided with low light amplifiers, which are carried by individuals.

PRIOR ART

With a known flight simulator (U.S. Pat. No. 5,380,204), equipped with a night vision device for the night flight training, an image generator generates video signals of a synthetic image that is displayed on an arrangement of several display screens. The display screens used are preferably cathode ray tubes (CRT displays), wherein projection screens of television projectors can also be used. The flight trainee can view the various screens through night vision goggles having a light sensitivity ranging from the visible to the near infrared spectral range of up to 920 nm. The image generator generates a monochromatic image which is shown on the CRT displays. Gray filters for weakening the image brightness are fitted over the front of the CRT displays or the night vision goggles, so that the dynamic range of the CRT displays is shifted downward and toward less brightness.

With a known vision system for stimulating real night vision goggles (U.S. Pat. No. 6,196,845 B1), a brighter night vision image with higher resolution is projected in the form of a so-called "projection patch" and with the aid of an additional projection channel in the respectively current viewing direction onto the display screen. In the process, the contrast of the "projection patch" is distorted by means of near infrared video signals, so as to offer a typical near infrared image to the night vision goggles, thereby simulating the spectral sensitivity characteristic of the night vision goggles. The additional projection channel requires that a so-called OTW (out of the window) image and a green image are projected onto the display screen, which can be seen directly with the naked eye, wherein the OTW image is also generated by the image generator and is supplied via an additional projection channel.

REPRESENTATION OF THE INVENTION

It is the object of the present invention to create a vision system using a night vision device, which makes it possible to view a projected image separate from images previously projected onto the projection screen, such as an OTW projection image or an OTW and green projection image.

This object is solved with the features disclosed in claim 1.

The vision system according to the invention has the advantage that it can be used optionally as stand-alone device, exclusively for stimulating the night vision device, and also as add-on device for a simulating night-vision scenarios that can be seen with the naked eye, in so-called OTW images. The technical expenditure for the vision system according to the invention is very low as compared to the known vision system with night vision characteristics because no additional OTW images and green images must be generated and projected onto the projection screen for the night vision. When the system is used as add-on device, the infrared image generated for the night vision device can be projected onto the same projection screen and with the same dimensions as the OTW image because it is not visible to the naked eye and can be seen only with the night vision device. As a result, it is possible to dispense with the technically involved "head tracker" for an eyepoint-correct projection of the so-called projection patch, which is absolutely required for the aforementioned, known vision system. Owing to the fact that the momentary OTW image is generated with eyepoint reference and that the same eyepoint reference is used for the image projected for the night vision device, the observer can view all areas on the projection screen with the night vision device by swiveling his/her head, without this requiring a change in the generated image.

Useful embodiments of the vision system according to the invention, as well as advantageous modifications and. embodiments of the invention follow from the additional claims.

According to one preferred embodiment of the invention, the night vision device is provided in the front with a narrow-band interference filter, which is adapted to the wavelength of the light from the laser source. With the aid of this narrow-band interference filter, for which the transmission wavelength is adapted to the wavelength of the light from the laser source and the narrow-band characteristic is adapted to the stability of the laser source, the projected image can be viewed through the night vision device separately and without interference from environmental influences, such as scattered light and extraneous light or an OTW projection image visible with the naked eye, and with good stimulation of the night vision device. By blanking out the extraneous light, the projected image for stimulating the night vision device can be displayed on the same display screen, together with a visible OTW image that simulates the night scenarios, without requiring a manipulation of the brightness of the OTW image or the simulation chamber. The vision system user can thus be simultaneously supplied with two different images, wherein one is the image seen through the night vision device and one is an OTW image that can be seen with the naked eye. This is advantageous because during real-time operations, it is possible to see images through the night vision device as well as around the device, in downward direction and to the side through the windows of an airplane cockpit or a control center and to see the cockpit instruments (peripheral vision). For specific application cases, the user looking through the night vision device can furthermore be presented with completely different image content than the one presented for the OTW image visible with the naked eye. There is no need to darken the simulation chamber for night vision training since extraneous and scattering light influences are suppressed by the interference filter and the projected OTW image does not interfere with the image detail visible through the night vision device.

According to one advantageous embodiment of the invention, the laser source for the projector is a laser diode, for which the output can be modulated directly and easily. Using a laser diode can furthermore result in a lower weight and volume, as well as in lower production costs for the projector.

BRIEF DESCRIPTION OF THE DRAWING

The invention is described in further detail in the following with the aid of an exemplary embodiment illustrated in the drawing, which shows in.

METHODS FOR REALIZING THE INVENTION

Figure 1:
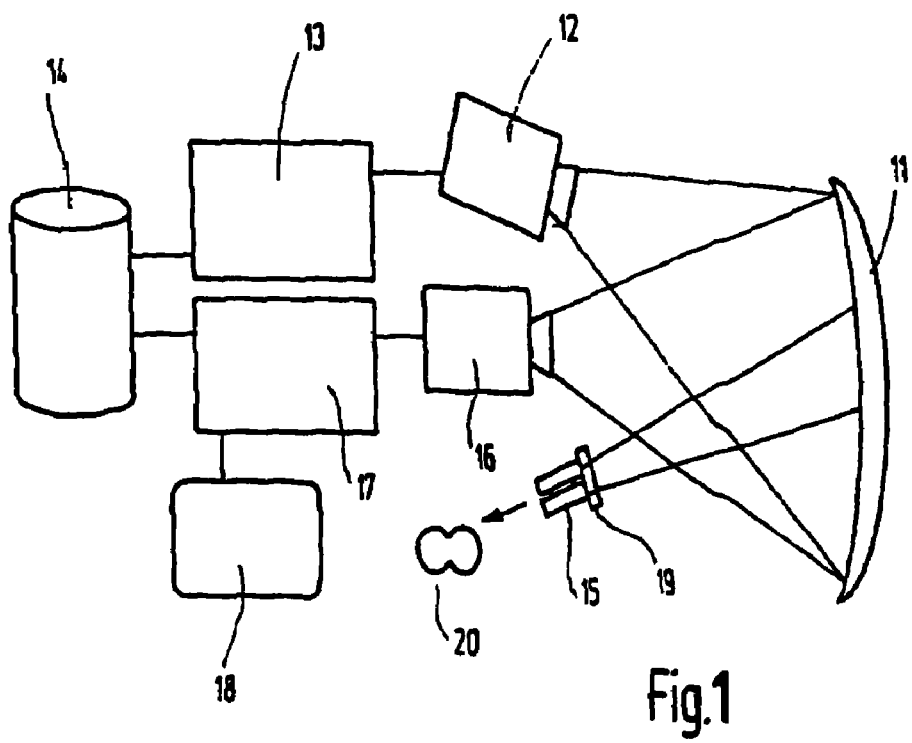
FIG. 1 a block diagram of a vision system for displaying synthetically generated images for the stimulation of night vision goggles (NVG), FIG. 2 a diagram showing the spectral sensitivity of the night vision goggles used with the vision system according to FIG. 1, FIG. 3 a block diagram of the vision system according to FIG. 1, expanded by an additional NVG channel.

The vision system, sketched as block diagram in FIG. 1, is preferably used in flight simulators for training pilots for daytime and nighttime flying. The same configuration can also be used in connection with other training simulators where night vision conditions occur, for example training simulators for land vehicles or simulators for tactical training and reconnaissance. In the flight simulator, the pilot sits inside a reproduction of an airplane or helicopter cockpit and, through at least one window in the cockpit, views at least one projection screen that is arranged outside of the cockpit. An image of an environmental scenario is projected onto this screen and is continuously synchronized with the flight movement, such that it corresponds to the realistic view as seen through the at least one cockpit window (OTW: out of the window).

The vision system is provided in a known manner with at least one projection screen 11, at least one projector 12 that is assigned to the projection screen 11, an image generator 13 for generating image signals of a synthetic image that is visible and in color, and a database 14 with therein stored terrain models, object models, and textures, as well as control data for coordinating the control of the airplane and the vision system. The image generator 13 accesses the database 14 and generates image signals for a selected daytime or nighttime scenario, which is visible to the naked eye, the so-called OTW (out of the window) view. The image signals or video signals are fed into the projector 12 and are visualized by the projector 12 on the projection screen 11.

Specific areas of application call for the night flight training with the aid of night vision devices, in the present case night vision goggles (NVG). The night vision goggles 15 can be attached to the helmet of a helicopter pilot, for example, and allow the viewing through the night vision goggles 15 as well as a peripheral view with the naked eye to the side and downward around the night vision goggles 15. The pilot consequently can also see with the naked eye portions of the visible image of the nighttime scenario, displayed on the at least one projection screen 11, and can furthermore read the cockpit instruments.

To stimulate the original night vision goggles 15 by means of the image projected onto the display screen, thereby providing the pilot with a realistic image 20 of the image detail seen through the night vision goggles 15, the vision system is additionally provided with a laser projector 16 for projecting an image that is not visible with the naked eye and can be seen only with the aid of the night vision goggles 15. This image is also projected onto the projection screen 11 and on this screen is superimposed on the visible image of the nighttime scenario, previously projected onto the screen. A projection channel of this type is referred to in the following as NVG channel. The image projected for viewing with the night vision goggles 15, the so-called NVG image, is projected with at least the same dimensions as the visible image of the night scenario and not simply with the dimensions for the image detail that can be captured with the night vision goggles 15, so that the pilot can successively view details of the complete image by swiveling his/her head. The laser projector 16 comprises a laser source that generates a laser beam with a light wavelength $\lambda$ in the invisible spectral range of the spectral sensitivity for the night vision goggles 15.

Figure 2:
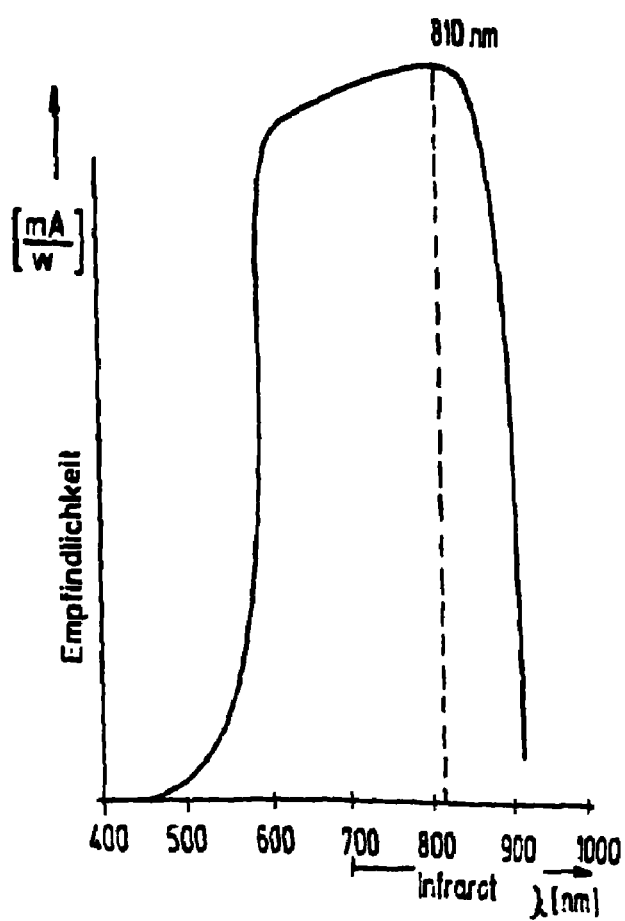

The diagram in FIG. 2 shows the course of the spectral sensitivity for night vision goggles normally used during military deployment. As shown in FIG. 2, the spectral sensitivity of the night vision goggles in this case ranges from approximately 625 nm to approximately 900 nm, meaning it extends from the visible red range into the invisible infrared range. The wavelength $\lambda$ for the light from the laser source is selected to be in the range between $\lambda=810$ nm and $\lambda=830$ nm, which is no longer visible to the naked eye and preferably represents the sensitivity maximum for the night vision goggles 15.

For the exemplary embodiment of the vision system shown herein, the laser projector 16 is assigned a separate image generator 17, which accesses the database 14 in the same way as the image generator 13 for the visible image. In addition to the data for generating the image, the database 14 also stores specific data relating to night vision goggles, such as material and reflection properties. The image generator 17 furthermore has access to a transformation unit 18, which stores specific display characteristics of the type of night vision goggles used, the parameters for the vision system, and the parameters for special effects. Alternatively, the transformation unit 18 can also be integrated into the image generator 17, as indicated symbolically in FIG. 3. The image generator 17 generates image signals which are modulated onto the light from the laser source with light wavelength $\lambda$ in the infrared range, if applicable modified with the aid of data from the transformation unit 18. The laser source for the laser projector 16 is preferably a laser diode, for which the output can be modulated easily with the image signals. A GaS laser diode is advantageously used for the laser diode.

As shown schematically in FIG. 1, a narrow-band interference filter 19 is fitted over the front of the night vision goggles 15 and is adapted to the wavelength $\lambda$ of the light emitted by the laser source of laser projector 16. The transmission wavelength for the interference filter 19 is preferably selected to be the same as the wavelength $\lambda$ for the laser light source and the band width of the interference filter 19 is preferably adapted to the stability of the selected wavelength $\lambda$ of the laser source. For example, if the wavelength $\lambda$ for the light emitted by the laser source is selected to be in the range between $\lambda=810$ nm and $\lambda=830$ nm, then the band width of the interference filter 19 is determined to be approximately 10-30 nm. The interference filter 19 functions to suppress interfering and extraneous light influences in the night vision goggles 15, so that the OTW vision is suppressed in the night vision goggles 15 and the night vision goggles 15 can also be used for the flight training under night vision conditions, without the necessity of having to darken the simulation chamber. When using the night vision goggles 15, there is no need to provide special instrument and cockpit lighting that is compatible with the night vision goggles.

Of course, it is also possible to use it as stand-alone equipment for the projection of the infrared image for the night vision device, without the additional projection of the OTW vision. In that case, the image generator 13 and the projector 12 can be omitted.

It is furthermore possible to dispense with the image generator 17 for the laser projector 16 when using the vision system shown in FIG. 1. In that case, the image signals for the laser projector 16 are derived from the image generator 13, which generates the night scenario for the OTW image. These image signals are modified with the aid of the parameters stored in the transmission unit 18, prior to feeding them into the laser projector 16.

Figure 3:
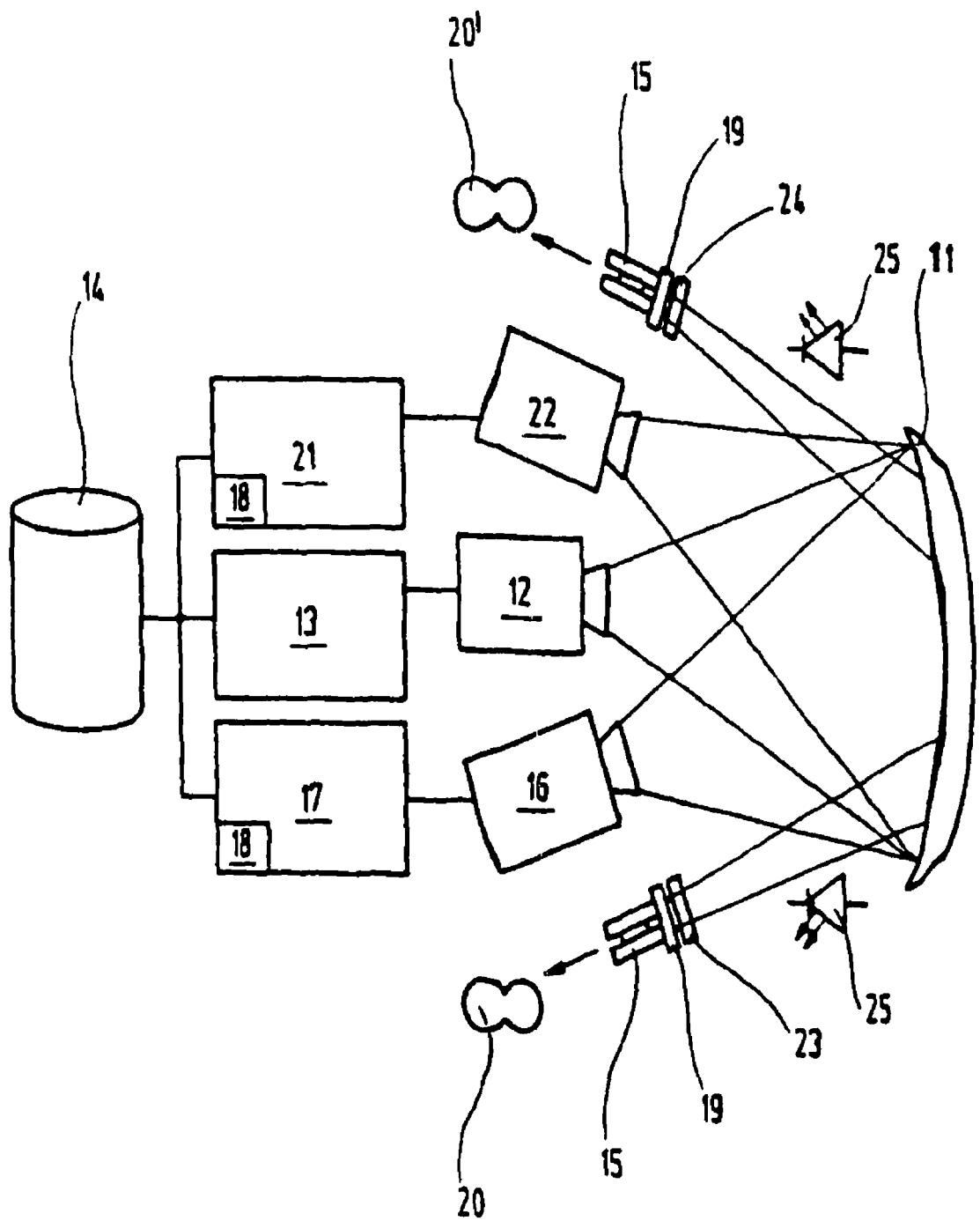

The vision system shown with the block diagram in FIG. 3 differs from the one shown with the block diagram in FIG. 1 only by an added second NVG channel, so that the same components are given the same reference numbers. This vision system takes into consideration that pilot and co-pilot view the same image details on the projection screen 11, but from different viewing angles. An additional NVG channel is therefore provided for the co-pilot, wherein this channel comprises an image generator 21 (with integrated transformation unit 18) and an additional laser projector 22 for the image projection. The image generator 21 and the laser projector 22 are embodied identical to the image generator 17 and the laser projector 16 for the pilot. The image generator 21 also accesses the database 14 and generates an image scenario that is identical to the one generated by the image generator 17, but is referenced to the eyepoint of the co-pilot and not—as is the image generated by the image generator 17—to the eyepoint of the pilot. The two laser projectors 16 and 22 have orthogonal polarization directions, so that the NVG image projected by the laser projector 22 is rotated by 90°, relative to the NVG image projected by the laser projector 16. The pilot and the co-pilot use identical night vision goggles 15, wherein each is provided on the front with an interference filter 19. Each of the two night vision goggles 15 is furthermore provided with a polarization filter 23 and/or 24 on the front, wherein the polarization directions for the two polarization filters 23, 24 are rotated by 90°, relative to each other, and the polarization direction of the polarization filter 23 coincides with the polarization direction of the laser projector 16 while the polarization direction of the polarization filter 24 coincides with the polarization direction of the laser projector 22. These two polarization filters 23, 24 ensure that the pilot can view through his/her night vision goggles 15 only the NVG image projected by the laser projector 16 and referenced to the pilot's eyepoint, whereas the co-pilot can view through his/her night vision goggles 15 only the NVG image projected by the laser projector 22 and referenced to the co-pilot's eyepoint. These images can be viewed in the form of image details over the complete projection screen 11. The realistic image of an image detail of the NVG image that is referenced to the eyepoint of the co-pilot and seen through the night vision goggles 15 of the co-pilot, is given the reference number 20' in FIG. 3.

Several infrared light emitting diodes 25 are arranged distributed over the cockpit area to further improve the stimulation of the night vision goggles 15 with respect to the cockpit and/or instrument lighting, wherein these diodes emit light that can be seen only when looking through the night vision goggles 15. Gallium arsenide (GaS) light emitting diodes are used, for example, for the diodes 25 that emit infrared light.

The invention claimed is:

1. A vision system for displaying synthetically generated images for stimulating night vision devices, in particular used in training simulators for the driving and flight control training, as well as for reconnaissance and observations operations under night vision conditions, said system comprising:

at least one image generator for generating image signals of a synthetic image, at least one projector to which the image signals are fed for projecting the image onto at least one projection screen further comprising a night vision device for viewing the projected image, wherein the at least one projector is provided with a laser source generating a laser projection beam and emitting laser light with a wavelength ($\lambda$) in an invisible spectral range and within the spectral sensitivity of the night vision device and wherein image signals are modulated onto the laser light, a second image generator for generating image signals of a second synthetic image that are in color and visible, a second projector to which the image signals for the second synthetic image are fed for projecting the second image onto the projection screen, the two images being independent from each other and projected simultaneously and superimposed, characterized in that a narrow-band interference filter that is adapted to the wavelength ($\lambda$) of the light from the laser source is fitted onto the front of the night vision device; and that the band width of the interference filter is adapted to the stability of the laser source and ranges from 10 nm to 30 nm.

2. The vision system according to claim 1, wherein the image projected by the projector onto the projection screen and viewed with the night vision device is considerably larger in size than the image detail that can be viewed with the night vision device.

3. The vision system according to claim 1, wherein the wavelength ($\lambda$) for the light from the laser source is in the infrared range.

4. The vision system according to claim 3, wherein the wavelength ($\lambda$) for the light from the laser source is in the range of 810 nm to 830 nm.

5. The vision system according to claim 1, wherein the laser source is a laser diode.

6. The vision system according to claim 1, wherein a polarization filter is fitted over the front of the night vision device and that the polarization direction for the projector coincides with the polarization direction for the polarization filter.

7. The vision system according to claim 6, wherein a second projector is provided, for which the polarization direction is different from the one for the first projector, which projects an image onto the screen that deviates from the image projected by the first projector, and that a second night vision device is provided, having a polarization filter fitted over the front, for which the polarization direction is rotated by 90°, relative to the polarization direction of the filter that is fitted over the front of the first projector.

8. The vision system according to claim 7, wherein both images projected by the projectors show the same night-time scenario, which is generated in each image with reference to a different eyepoint.

9. The vision system according to claim 1, wherein infrared light emitting diodes are arranged in front of the projection screen, within the space that can be viewed successively with the night vision device.

* * * * *